April 2, 1940.                    C. SAURER                    2,196,083
FLOOR BOARD SEAL
Filed May 25, 1938
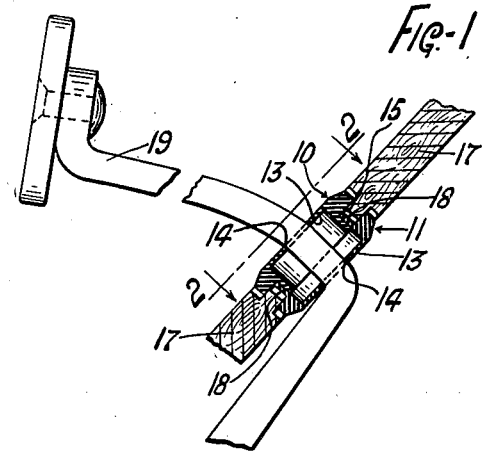
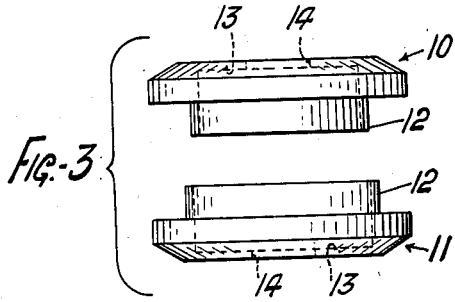
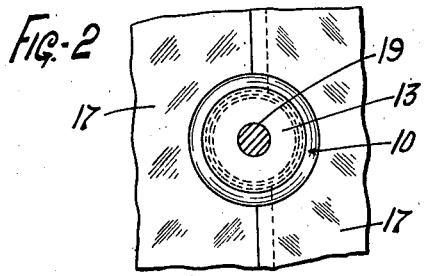
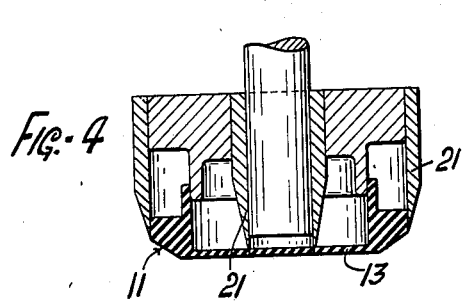
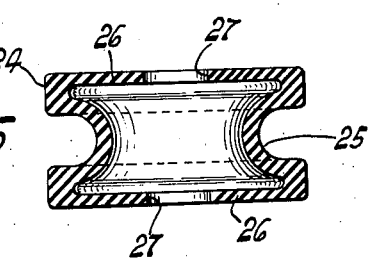
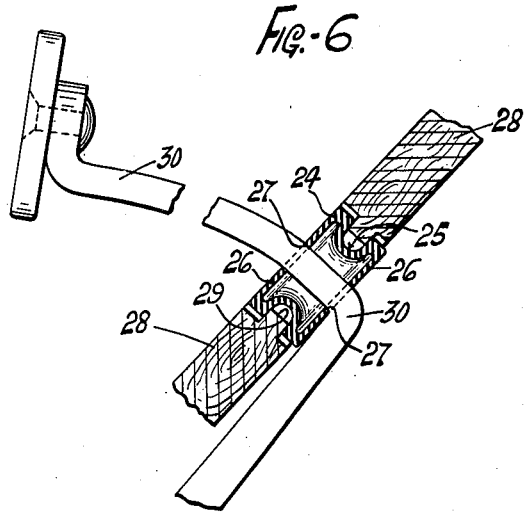
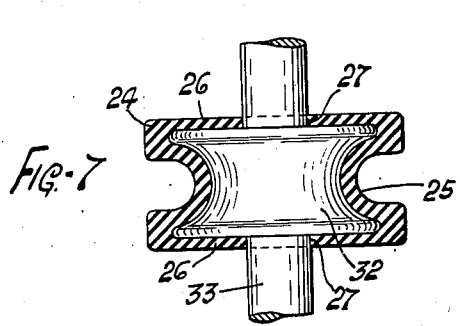
INVENTOR
CURT SAURER
BY
ATTORNEYS Patented Apr. 2, 1940

2,196,083

UNITED STATES PATENT OFFICE 2,196,083

FLOOR BOARD SEAL

Curt Saurer, Akron, Ohio, assignor to The Firestone Tire & Rubber Company, Akron, Ohio, a corporation of Ohio Application May 25, 1938, Serial No. 209,945

1 Claim. (Cl. 74—566)

This invention relates to floor board seals, and more especially it relates to seals that are mountable in the floor board of a motor vehicle, about the clutch or brake pedal levers thereof, and adapted to maintain sealed engagement with said levers during the operation thereof.

The chief objects of the invention are more effectively to close the pedal openings in the floor board of a vehicle and thereby to prevent dust, dirt, water and cold air from entering therethrough; to provide a seal of the character mentioned that will be of simple construction; to provide a seal that readily may be mounted in the floor board of a vehicle; that will maintain sealed engagement with the pedal levers at all times; and that will not interfere with the normal functioning of said levers. Other objects will be manifest as the specification proceeds.

Of the accompanying drawing:

Figure 1 is a vertical section through the floor board of a motor vehicle and one embodiment of the improved seal mounted in an opening therein, a pedal lever being shown, in side elevation, in operative association with said seal;

Figure 2 is a section on the line 2—2 of Figure 1;

Figure 3 is a side elevation of the improved seal, on a larger scale, with the respective parts thereof in separated relation;

Figure 4 is a diametric section through one unit of the improved seal, showing how the same is trimmed and perforated during the manufacture thereof;

Figure 5 is a diametric section through another embodiment of the improved seal;

Figure 6 is a view similar to Figure 1 showing the second embodiment of the seal in operative association with a floor board and pedal lever; and Figure 7 is a diametric section of the seal as it appears before removal from the mandrel upon which it is molded.

The embodiment of the invention shown in Figures 1 to 4, inclusive, of the drawing, is a two-part sectional structure, the respective parts of which are designated 10 and 11. The seal is composed of vulcanized rubber composition that is relatively soft and resilient. Each of the members 10, 11 is of annular form, and has a short, axially-extending flange or sleeve 12 on its inner margin, the outside diameter of sleeve 12 on section 10 being substantially the same as the inside diameter of sleeve 12 on section 11, whereby said sleeves may be telescoped in the assembled condition of the seal. The axial opening of each seal-section 10, 11 at the end thereof remote from sleeve 12 is spanned by a web or diaphragm 13, which diaphragm has an axial aperture 14 therein. When seal-section 10 is assembled with section 11 the seal structure appears as illustrated in Figure 1. The telescoped sleeves keep the body portions of the annular structures in spaced relation so that there is an annular groove 15 in the assembled structure.

The seal is seated in a circular aperture in the floor board 17 of a motor vehicle. The floor board aperture is counterbored on both sides to provide a medial, inwardly extending, annular flange or tenon 18 that fits within the groove 15 of the seal, said tenon and said counterbores being of larger diameter than the groove 15 and the outside diameters of sections 10, 11, with the result that there is clearance about the seal that permits it to move radially in all directions relatively of its seat. Preferably the floor board aperture is located at the juncture of two of the floor board sections, as shown in Figure 2, to facilitate mounting of the seal in the aperture. The seal is arranged to circumscribe a pedal lever 19 that extends through the apertures 14 in the respective diaphragms 13 of the seal, the diaphragm margins about said apertures lightly engaging the pedal lever and thereby effectively sealing the lever opening in the floor board. The diaphragms 13 are sufficiently thin that the lever 19 will slide through the apertures therein upon axial movement of said lever, and any lateral movement of the lever causing the seal to move edgewise as a unit within its seat.

The seal-sections 10, 11 are vulcanized in a mold in the usual manner, wiith the diaphragm 13 in imperforate condition, the aperture 14 subsequently being formed by means of a punch 21 that also is constructed and arranged to trim the overflow from the perimeter of the seal-section, as shown in Figure 4.

The embodiment of the invention hereinbefore described is designated for use with pedal levers that have considerable amplitude of movement during operation, thus requiring that the seal be relatively large in inside diameter. If the pedal lever has relatively little operative movement, a seal of smaller size may be utilized, and such seal may be in one piece instead of sectional.

Referring now to Figures 5 to 7 of the drawing, there is shown a one piece seal 24 of resilient rubber composition. Said seal 24 is a hollow structure of general cylindrical form, and having a medial circumferential, constricted region that provides a circumferential groove 25 on the exterior thereof. The respective ends of the seal 24 are provided with relatively thin diaphragms 26, each of which is formed with an axial aperture 27. The seal 24 is mounted in a suitable aperture in a floor board 28, there being an inwardly extending flange or tenon 29 in the aperture for engagement in the groove 25 of the seal. The floor board aperture and the tenon 29 are of such size as to provide clearance about the seal, thus enabling the latter to slide about on its seat in the manner previously described. A pedal lever 30 extends through the axial apertures 27 of the seal in the same manner as in the previously described embodiment of the invention.

The seal 24 is manufactured by being molded and vulcanized upon a mandrel 32 that has the shape of the hollow interior of the seal, said mandrel comprising an axial stem 33 that forms the apertures 27 in the seal, as is shown in Figure 7. The mandrel 32 is removed from the vulcanized seal 24 through one of the apertures 27 therein, the diaphragms 26 being sufficiently thin and elastic to stretch over the largest diameter of the mandrel. In the first described embodiment of the invention, the inside diameter of the seal is so great as to preclude the removal of a mandrel in the manner described with relation to the last described embodiment, thus requiring that the embodiment first described be made initially as separable sections.

The improved seal effectively closes the pedal lever openings in the floor board of a motor vehicle, thus making for cleanliness and even temperature within the vehicle. The seal is substantially flush with the upper side of the floor board but extends beyond the lower surface thereof to form a cushion against which the pedal normally rests when not in depressed position.

Other modification may be resorted to without departing from the spirit of the invention, or the scope thereof as defined by the appended claim.

What is claimed is:

A floor board seal for the pedal levers of motor vehicles, said seal consisting of a hollow annular structure of resilient material having relatively thin end walls, the latter being formed with axial apertures of relatively small diameter as compared to the inside diameter of the structure, through which apertures a pedal lever may pass with sliding fit, said structure consisting of two axially separable sections that telescope with each other in the medial region of the seal, the structure being formed exteriorly with a peripheral groove in its medial region in which a tenon in a floor board aperture is receivable.

CURT SAURER.